United States Patent
Beit

(10) Patent No.: US 12,383,083 B2
(45) Date of Patent: Aug. 12, 2025

(54) PILLOW ELEVATING ASSEMBLY

(71) Applicant: Hashem Beit, Indianapolis, IN (US)

(72) Inventor: Hashem Beit, Indianapolis, IN (US)

( * ) Notice: Subject to any disclaimer, the term of this patent is extended or adjusted under 35 U.S.C. 154(b) by 287 days.

(21) Appl. No.: 18/121,977

(22) Filed: Mar. 15, 2023

(65) Prior Publication Data

US 2024/0306829 A1 Sep. 19, 2024

(51) Int. Cl.
| A47G 9/00 | (2006.01) |
| A47G 9/10 | (2006.01) |
| F16M 11/18 | (2006.01) |
| F16M 11/20 | (2006.01) |

(52) U.S. Cl.
CPC ........... *A47G 9/1009* (2013.01); *F16M 11/18* (2013.01); *F16M 11/2021* (2013.01)

(58) Field of Classification Search
CPC .......... A47G 9/00; A47G 9/10; A47G 9/1009; F16M 11/18; F16M 11/2021; F16M 11/10
See application file for complete search history.

(56) References Cited

U.S. PATENT DOCUMENTS

| 3,391,653 | A | * | 7/1968 | De Ridder | ............... | B61D 7/28 |
| | | | | | | 105/310 |
| 3,931,653 | A | * | 1/1976 | Bien | .................... | A47C 20/027 |
| | | | | | | 5/660 |
| 4,185,342 | A | | 1/1980 | Young | | |
| 4,458,370 | A | | 7/1984 | Fickler | | |
| 4,625,348 | A | * | 12/1986 | Renggli | ............... | A47C 20/048 |
| | | | | | | 5/618 |
| 4,628,348 | A | * | 12/1986 | Ensinger | .................. | H04N 9/77 |
| | | | | | | 348/712 |
| 5,937,439 | A | * | 8/1999 | Barthold | ................ | A42B 3/185 |
| | | | | | | 2/5 |
| 5,970,545 | A | | 10/1999 | Garman | | |
| D804,850 | S | | 12/2017 | Acosta De Nicolo | | |
| 2010/0132119 | A1 | | 6/2010 | Taghikhani | | |
| 2012/0023669 | A1 | | 2/2012 | Graller | | |
| 2017/0143254 | A1 | | 5/2017 | Bell | | |
| 2017/0273481 | A1 | * | 9/2017 | Du | ....................... | A61G 13/121 |
| 2019/0150626 | A1 | * | 5/2019 | Huang | ................. | A47C 20/041 |

\* cited by examiner

*Primary Examiner* — Fredrick C Conley

(57) ABSTRACT

A pillow elevating assembly for improving sleep posture includes a base that is positionable on top of a mattress of a bed. A panel is hingedly coupled to the base and the panel is positionable at a variety of angles with respect to the base such that the panel defines an angled support surface for a pillow. A pair of mating members is each attached to the panel for retaining the pillow on the panel. A pair of lifting units is each integrated into the base and each of the lifting units is in mechanical communication with the panel. Each of the lifting units lifts the panel into a desired angle with the base when the lifting units are actuated. A control is attached to the panel for actuating the lifting unit to position the panel at a desired angle.

7 Claims, 7 Drawing Sheets

PILLOW ELEVATING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to elevating devices and more particularly pertains to a new elevating device for improving sleep posture. The device includes a base that is positionable on a mattress and a panel hingedly attached to the base. The device includes a lifting unit integrate into the base for lifting or lowering the panel into a desired angle with respect to the base. In this way the panel can support a pillow at the desired angle to hold a user's head at an upward angle.

(2) Description of Related Art Including Information Disclosed Under 37 CFR 1.97 and 1.98

The prior art relates to elevating devices including a device for adjusting the angle of a pivotable surface includes a base, a panel hingedly disposed on the base and a plurality of pneumatic actuators for moving the panel. The prior art discloses a portable adjustable backrest that includes a base, a panel hingedly coupled to the base, a lock attached to the base and an arm attached to the panel which has a series of engagement points that can be engaged by the lock for retaining the panel at one of a plurality of predetermined angles. The prior art discloses a backrest support apparatus that includes an inflatable bag structure that moves into an angled orientation when inflated. The prior art discloses a collapsible wedge that is positionable on a mattress for supporting a user in an inclined orientation while sleeping. The prior art discloses an upper body lift that includes a base, a panel hingedly coupled to the base and an actuator coupled to the base and slidably attached to the panel for lifting and lowering the panel.

BRIEF SUMMARY OF THE INVENTION

An embodiment of the disclosure meets the needs presented above by generally comprising a base that is positionable on top of a mattress of a bed. A panel is hingedly coupled to the base and the panel is positionable at a variety of angles with respect to the base such that the panel defines an angled support surface for a pillow. A pair of mating members is each attached to the panel for retaining the pillow on the panel. A pair of lifting units is each integrated into the base and each of the lifting units is in mechanical communication with the panel. Each of the lifting units lifts the panel into a desired angle with the base when the lifting units are actuated. A control is attached to the panel for actuating the lifting unit to position the panel at a desired angle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
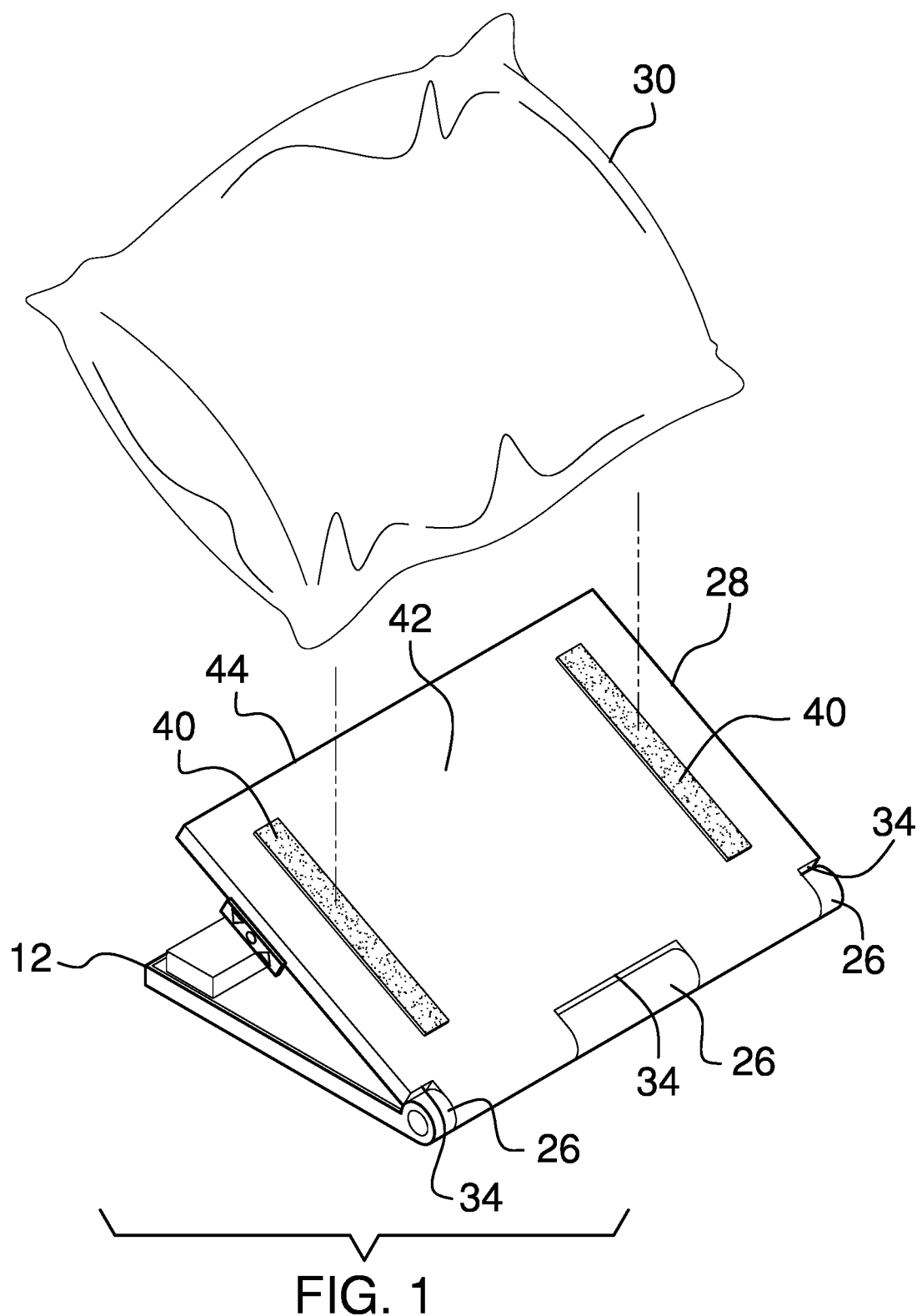
FIG. 1 is an exploded perspective view of a pillow elevating assembly according to an embodiment of the disclosure.
Figure 2:
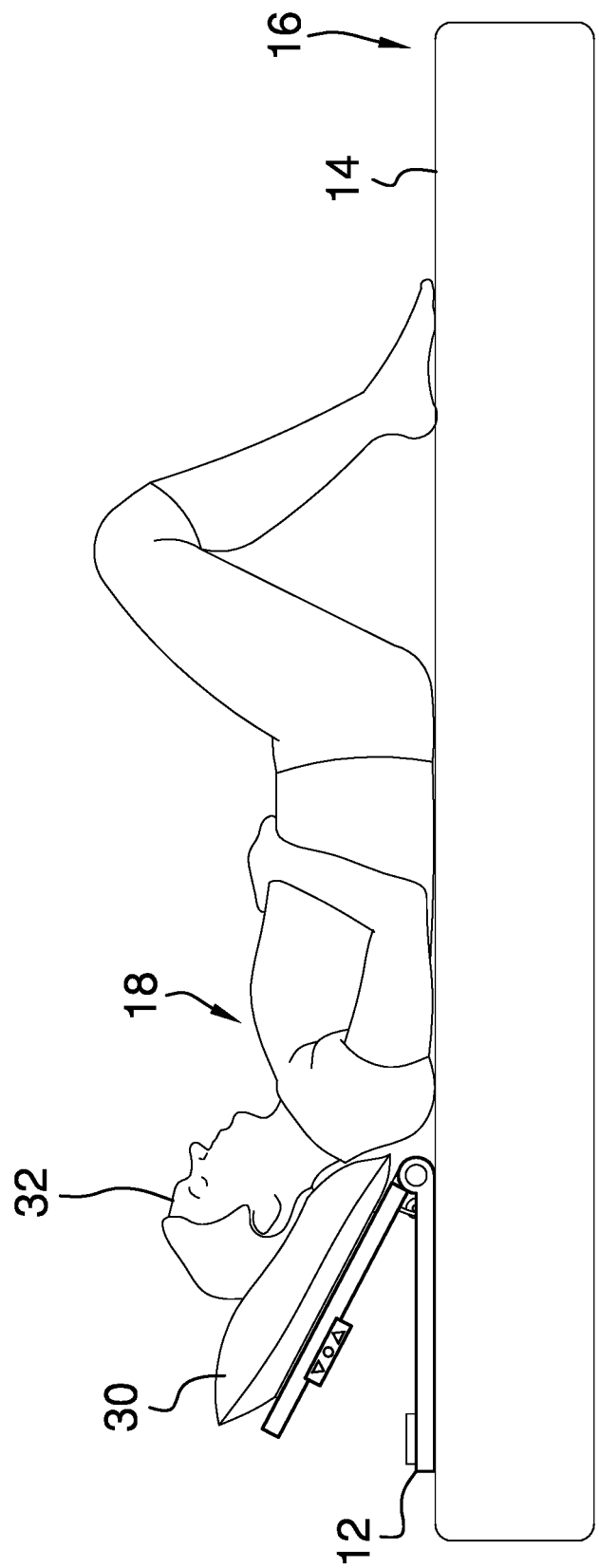
FIG. 2 is a perspective in-use view of an embodiment of the disclosure.
Figure 3:
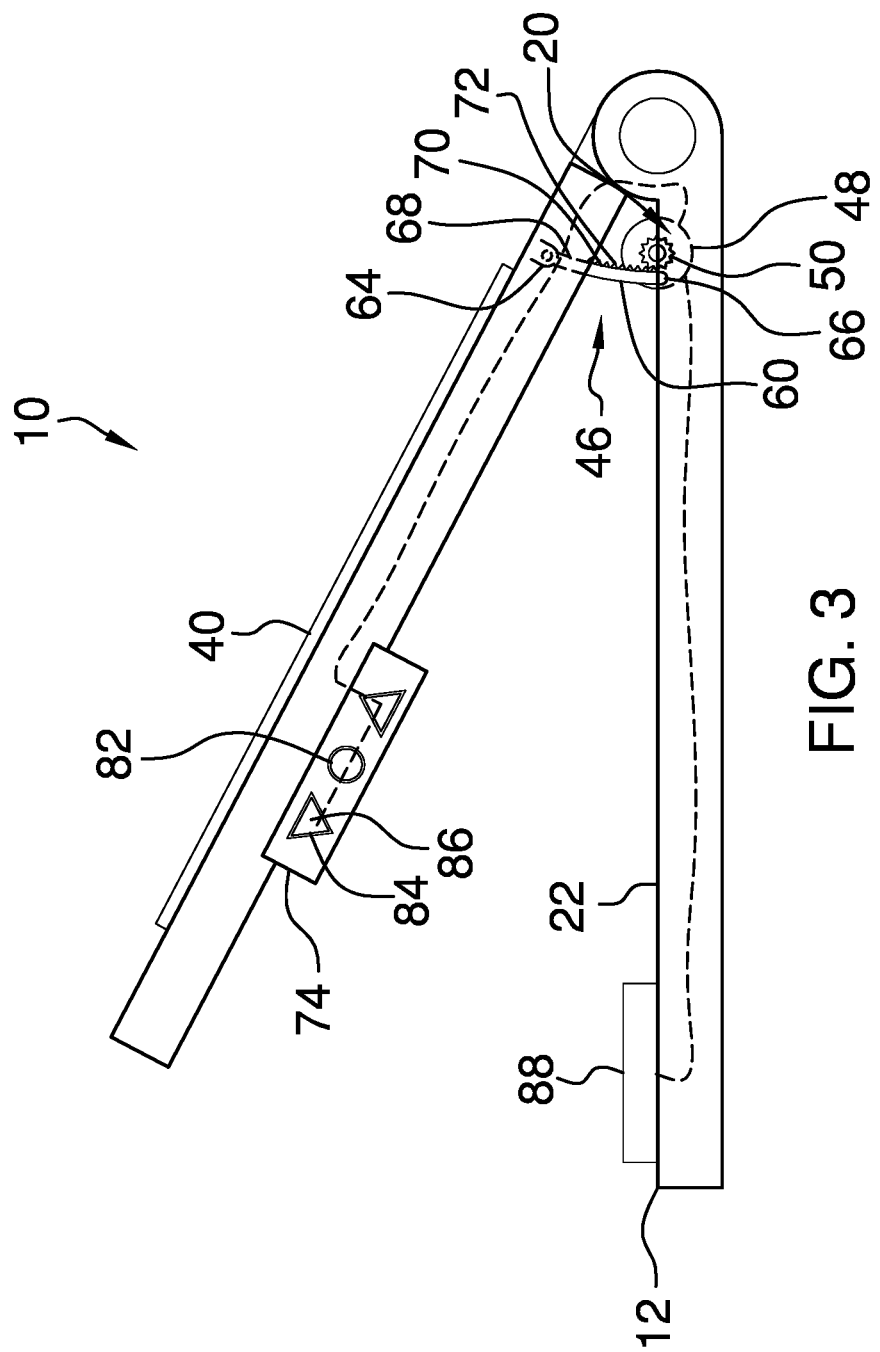
FIG. 3 is a right side view of an embodiment of the disclosure showing a panel in a lifted orientation.
Figure 4:
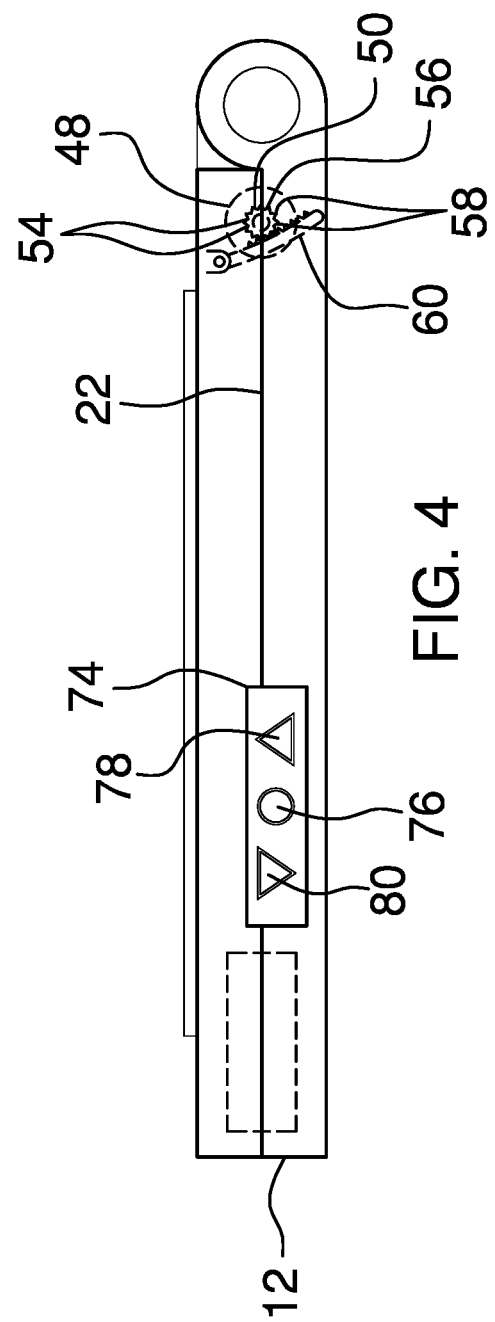
FIG. 4 is a right side view of an embodiment of the disclosure showing a panel in a lowered orientation.
Figure 5:
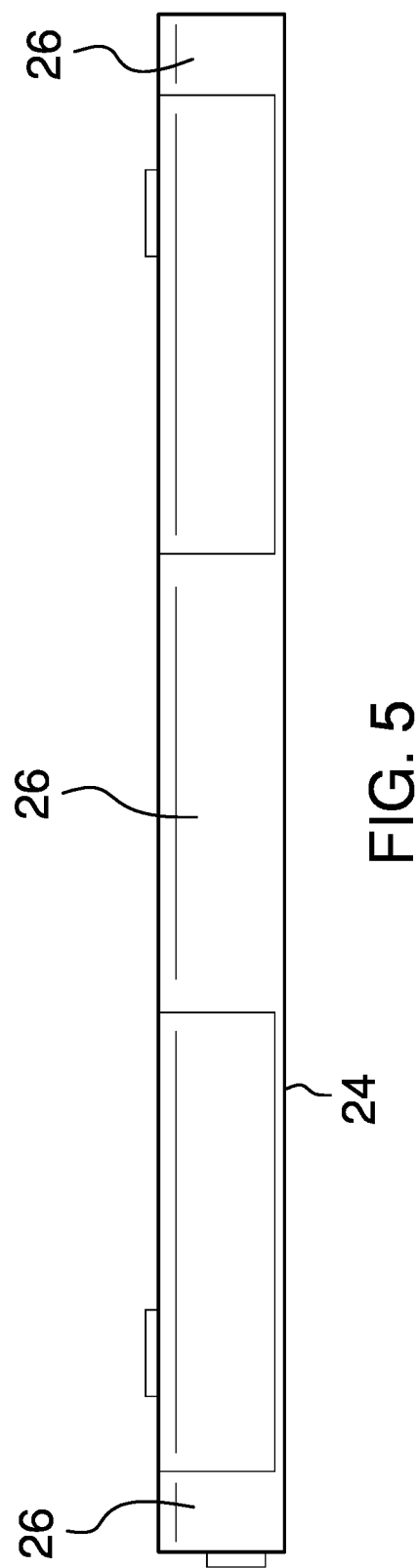
FIG. 5 is a front view of an embodiment of the disclosure showing a panel in a lowered orientation.
Figure 6:
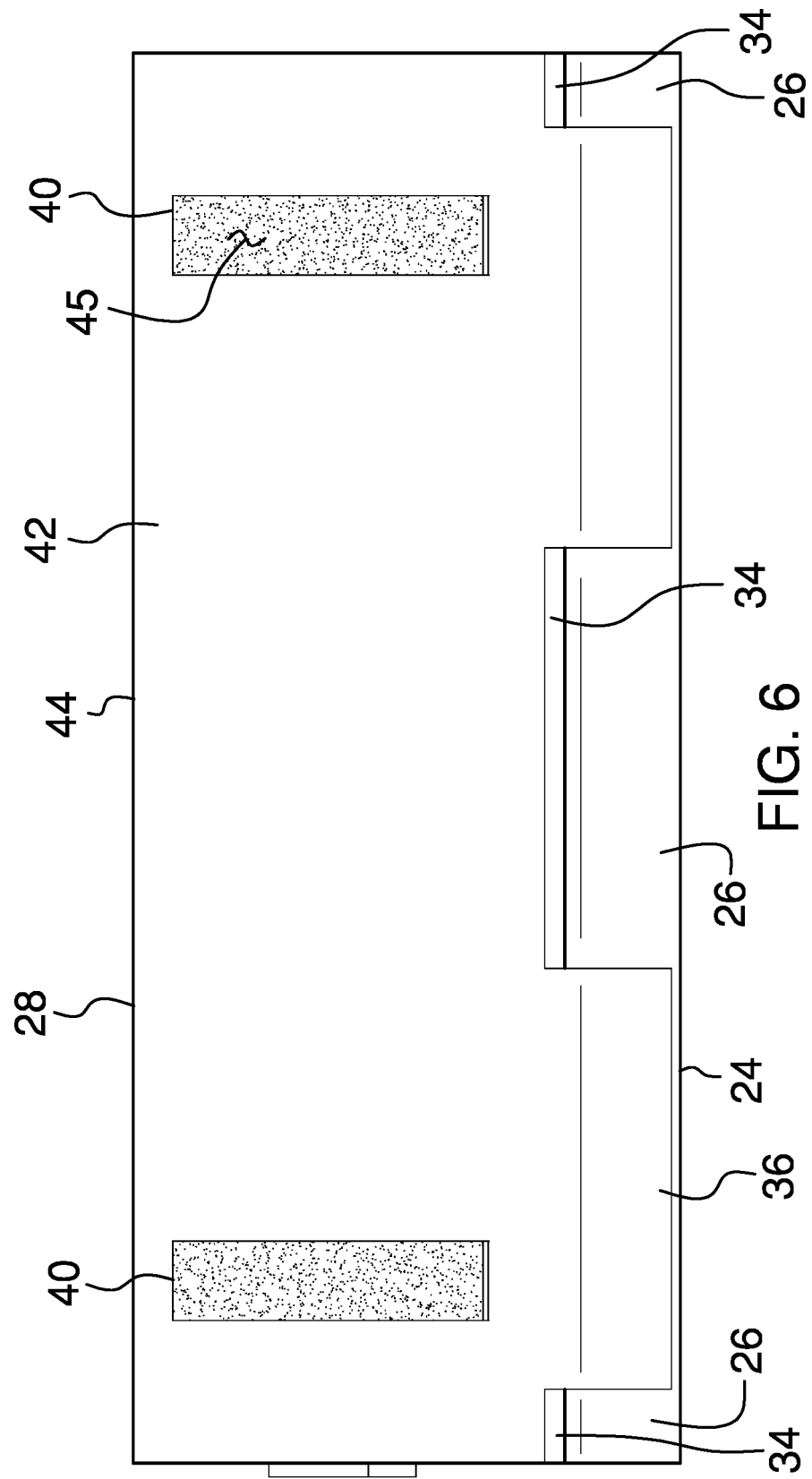
FIG. 6 is a front view of an embodiment of the disclosure showing a panel in a lifted orientation.
Figure 7:
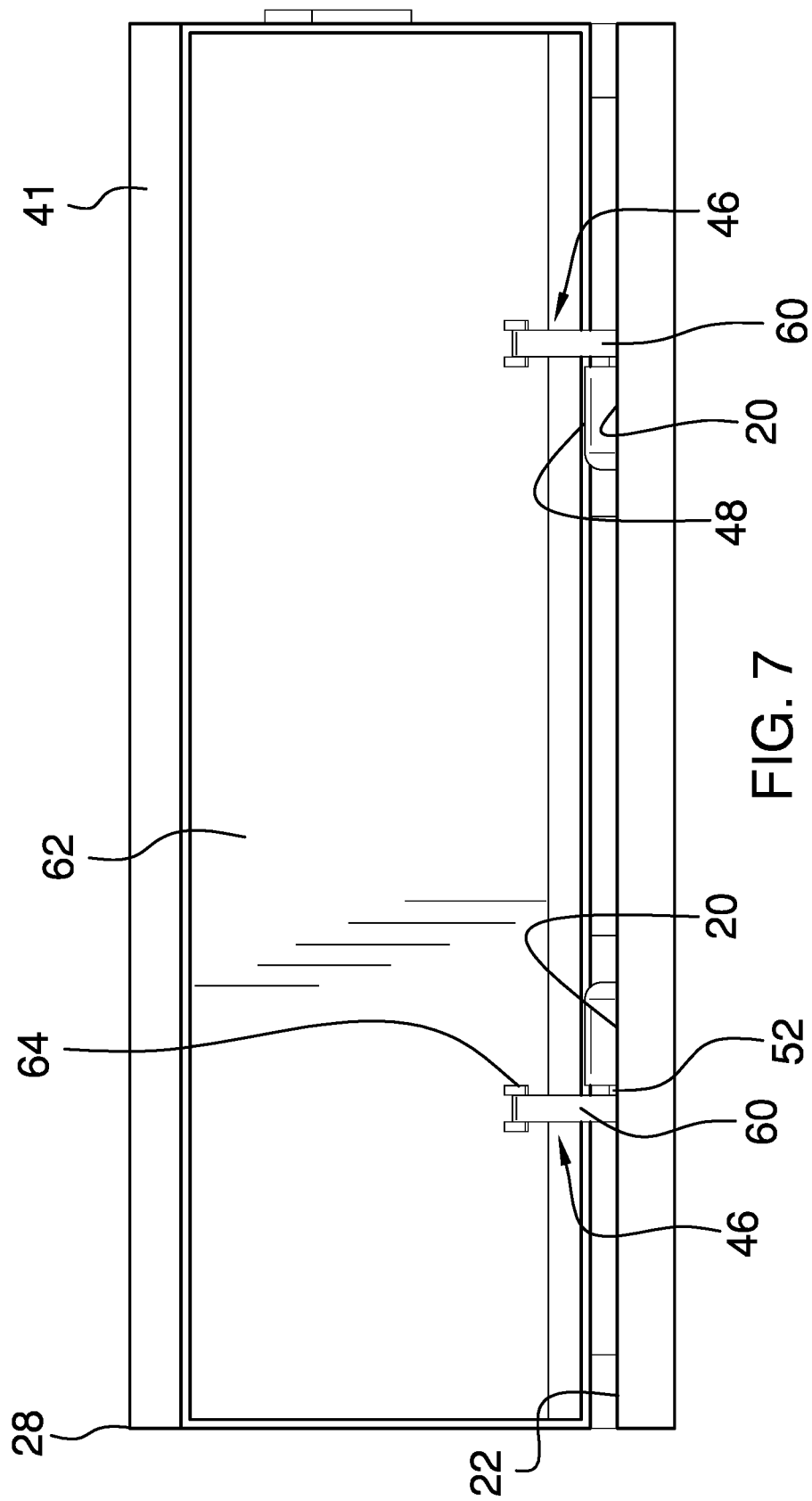
FIG. 7 is a back view of an embodiment of the disclosure showing a panel in a lifted orientation.

With reference now to the drawings, and in particular to FIGS. 1 through 7 thereof, a new elevating device embodying the principles and concepts of an embodiment of the disclosure and generally designated by the reference numeral 10 will be described.

As best illustrated in FIGS. 1 through 7, the pillow elevating assembly 10 generally comprises a base 12 that is positionable on top of a mattress 14 of a bed 16. The bed 16 may be a sleeping bed of any conventional design upon which a user 18 will sleep. The base 12 has a pair of holes 20 each extending through a top wall 22 of the base 12. Each of the holes 20 is spaced from a front side 24 of the base 12 and the holes 20 are spaced apart from each other and are distributed along the front side 24. The base 12 has a plurality of lobes 26 each extending upwardly from the top wall 22 and the lobes 26 are spaced apart from each other and are distributed along the front side 24 of the base 12.

A panel 28 is provided and the panel 28 is hingedly coupled to the base 12. The panel 28 is positionable at a variety of angles with respect to the base 12 such that the panel 28 defines an angled support surface for a pillow 30. In this way the pillow 30 can be retained at an angle to facilitate the user's head 32 to be at an angle when the user 18 sleeps. In this way the user 18 can enjoy relief from sinus pressure, for example, and other physical benefits from sleeping with their head angled upwardly.

The panel 28 has a plurality of notches 34 each extending into a rear side 36 of the panel 28. The notches 34 are spaced apart from each other and are distributed along the rear side 36. Furthermore, each of the lobes 26 on the top wall 22 of the base 12 is positioned in a respective one of the notches 34. A shaft 38 extends laterally through each of the lobes 26 and laterally through the panel 28 for hingedly attaching the panel 28 to each of the lobes 26. As is most clearly shown in FIG. 7, the panel 28 has a perimeter wall 41 extending downwardly from a bottom side 62 of the panel 28.

A pair of mating members 40 is each attached to the panel 28 thereby facilitating the pair of mating members 40 to engage the pillow 30 for retaining the pillow 30 on the panel 28. Each of the mating members 40 is positioned on a top side 42 of the panel 28. Additionally, each of the mating members 40 is oriented to extend substantially between a front side 44 of the panel 28 and the rear side 36 of the panel 28. Each of the mating members 40 has an exposed surface 45 with respect to the top side 42 of the panel 28 which engages the pillow 30 when the pillow 30 is positioned on the panel 28. Furthermore, each of the mating members 40 may comprise, but not be limited to, an adhesive strip, a hook and loop fastener or any other type of mating member that can repeatedly engage a fabric pillowcase without becoming degraded.

A pair of lifting units 46 is provided and each of the lifting units 46 is integrated into the base 12. Each of the lifting units 46 is in mechanical communication with the panel 28. Furthermore, each of the lifting units 46 lifts the panel 28 into a desired angle with the base 12 when the lifting units 46 are actuated. Each of the pair of lifting units 46 comprises a motor 48 that is positioned in a respective one of the holes 20 in the top wall 22 of the base 12. The motor 48 rotates in a first direction or a second direction when the motor 48 is turned on. Additionally, the motor 48 may comprise a two direction electric motor or the like.

Each of the lifting units 46 includes a gear 50 that is attached to an output shaft 52 of the motor 48. The gear 50 has a plurality of valleys 54 each extending into an outer surface 56 of the gear 50 to define a plurality of peaks 58 spaced apart from each other and distributed around the outer surface 56. Each of the lifting units 46 includes an arm 60 that is pivotally coupled to and extends downwardly from the bottom side 62 of the panel 28. The arm 60 is aligned with the motor 48 and the arm 60 is curved between a pivot 64 on the bottom side 62 of the panel 28 and a distal end 66 of the arm 60.

The arm 60 has a back side 68 extending between the pivot 64 on the bottom side 62 of the panel 28 and the distal end 66 and the back side 68 is concavely arcuate between the pivot 64 and the distal end 66. Furthermore, the arm 60 has a plurality of valleys 70 each extending into the back side 68 to define a plurality of peaks 72 spaced apart from each other and distributed along the back side 68. The plurality of peaks 72 on the back side 68 engages the plurality of peaks 58 on the outer surface 56 of the gear 50. In this way the arm 60 is urged upwardly when the motor 48 rotates in the first direction for lifting the panel 28. Conversely, the arm 60 is urged downwardly when the motor 48 rotates in the second direction for lowering the panel 28.

A control 74 is attached to the panel 28 and the control 74 is in communication with the lifting units 46 for actuating the lifting units 46 to position the panel 28 at a desired angle. The control 74 is electrically coupled to the motor 48 associated with each of the lifting units 46. Additionally, the control 74 includes a power button 76, a lift button 78 for lifting the panel 28 and a lower button 80 for lowering the panel 28. The power button 76 has an outer edge 82 that is continuously arcuate such that the power button 76 has a circular shape. Each of the lift button 78 and the lower button 80 has an outside edge 84 which has a plurality of intersecting sides 86 such that each of the lift button 78 and the lower button 80 has a triangular shape. The lift button 78 is oriented to point in a lifting direction on the control 74. Additionally, the lower button 80 is oriented to point in a lowering direction on the control 74. A power supply 88 is mounted to the top wall 22 of the base 12, the power supply 88 is electrically coupled to the control 74 and the power supply 88 comprises at least one battery.

In use, the base 12 is positioned on the mattress 14 and the power button 76 is depressed to turn on each of the lifting units 46. The lift button 78 is depressed to lift the panel 28 or the lower button 80 is depressed to lower the panel 28. In this way the panel 28 is positioned at a desired angle to support the pillow 30 at the desired angle. In this way the user's head 32 is held at an upward angle while the user 18 sleeps for reducing pressure in the user's head 32. In this way the user 18 can enjoy relief from sinus pressure, for example, and other physical benefits from sleeping with their head at an upward angle.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pillow elevating assembly for holding a pillow in an upward angle on a bed thereby enhancing comfort for a user while sleeping, said assembly comprising:

a base being positionable on top of a mattress of a bed, said base having a pair of holes each extending through a top wall of said base, each of said holes being spaced from a front side of said base, said holes being spaced apart from each other and being distributed along said front side, said base having a plurality of lobes each extending upwardly from said top wall, said lobes being spaced apart from each other and being distributed along said front side of said base;
a panel being hingedly coupled to said base, said panel being positionable at a variety of angles with respect to said base such that said panel defines an angled support surface for a pillow, said panel having a plurality of notches each extending into a rear side of said panel, said notches being spaced apart from each other and being distributed along said rear side, each of said lobes on said top wall of said base being positioned in a respective one of said notches;
a shaft extending laterally through each of said lobes and laterally through said panel for hingedly attaching said panel to each of said lobes;
a pair of mating members each being attached to said panel thereby facilitating said pair of mating members to engage the pillow for retaining the pillow on said panel, each of said mating members being positioned on a top side of said panel, each of said mating members being oriented to extend substantially between a front side of said panel and said rear side of said panel, each of said mating members having an exposed surface with respect to said top side of said panel which engages the pillow when the pillow is positioned on said panel;
a pair of lifting units, each of said lifting units being integrated into said base, each of said lifting units being in mechanical communication with said panel, each of said lifting units lifting said panel into a desired angle with said base when said lifting units are actuated, each of said pair of lifting units comprising:
  a motor being positioned in a respective one of said holes in said top wall of said base, said motor rotating in a first direction or a second direction when said motor is turned on;
  a gear being attached to an output shaft of said motor, said gear having an plurality of valleys each extending into an outer surface of said gear to define a plurality of peaks spaced apart from each other and distributed around said outer surface; and
  an arm being pivotally coupled to and extending downwardly from a bottom side of said panel, said arm being aligned with said motor, said arm being curved between a pivot on said bottom side of said panel and a distal end of said arm, said arm having a back side extending between said pivot on said bottom of said panel and said distal end, said back side being concavely arcuate between said pivot and said distal end, said arm having a plurality of valleys each extending into said back side to define a plurality of peaks spaced apart from each other and distributed along said back side, said plurality of peaks on said back side engaging said plurality of peaks on said outer surface of said gear, said arm being urged upwardly when said motor rotates in said first direction for lifting said panel, said arm being urged downwardly when said motor rotates in said second direction for lowering said panel;
a control being attached to said panel, said control being in communication with said lifting unit for actuating said lifting unit to position said panel at a desired angle, said control being electrically coupled to said motor associated with each of said lifting units, said control including a power button, a lift button for lifting said panel and a lower button for lowering said panel, said power button having an outer edge being continuously arcuate such that said power button has a circular shape, each of said lift button and said lower button having an outside edge which as a plurality of intersecting sides such that each of said lift button and said lower button has a triangular shape, said lift button being oriented to point in a lifting direction on said control, said lower button being oriented to point in a lowering direction on said control; and
a power supply being mounted to said top wall of said base, said power supply being electrically coupled to said control, said power supply comprising at least one battery.

2. A pillow elevating assembly for holding a pillow in an upward angle on a bed thereby enhancing comfort for a user while sleeping, said assembly comprising:
  a base being positionable on top of a mattress of a bed;
  a panel being hingedly coupled to said base, said panel being positionable at a variety of angles with respect to said base such that said panel defines an angled support surface for a pillow;
  a pair of mating members each being attached to said panel thereby facilitating said pair of mating members to engage the pillow for retaining the pillow on said panel;
  a pair of lifting units, each of said lifting units being integrated into said base, each of said lifting units being in mechanical communication with said panel, each of said lifting units lifting said panel into a desired angle with said base when said lifting units are actuated;
  a control being attached to said panel, said control being in communication with said lifting unit for actuating said lifting unit to position said panel at a desired angle;
  wherein said base having a pair of holes each extending through a top wall of said base, each of said holes being spaced from a front side of said base, said holes being spaced apart from each other and being distributed along said front side, said base having a plurality of lobes each extending upwardly from said top wall, said lobes being spaced apart from each other and being distributed along said front side of said base;
  wherein said panel has a plurality of notches each extending into a rear side of said panel, said notches being spaced apart from each other and being distributed along said rear side, each of said lobes on said top wall of said base being positioned in a respective one of said notches; and
  wherein said assembly includes a shaft extending laterally through each of said lobes and laterally through said panel for hingedly attaching said panel to each of said lobes.

3. The assembly according to claim 2, wherein each of said mating members is positioned on a top side of said panel, each of said mating members being oriented to extend substantially between a front side of said panel and said rear side of said panel, each of said mating members having an exposed surface with respect to said top side of said panel which engages the pillow when the pillow is positioned on said panel.

4. The assembly according to claim 2, wherein each of said pair of lifting units comprises:
  a motor being positioned in a respective one of said holes in said top wall of said base, said motor rotating in a first direction or a second direction when said motor is turned on;
  a gear being attached to an output shaft of said motor, said gear having a plurality of valleys each extending into an outer surface of said gear to define a plurality of peaks spaced apart from each other and distributed around said outer surface.

5. The assembly according to claim 4, wherein:
each of said pair of lifting units includes an arm being pivotally coupled to and extending downwardly from a bottom side of said panel, said arm being aligned with said motor, said arm being curved between a pivot on said bottom side of said panel and a distal end of said arm, said arm having a back side extending between said pivot on said bottom of said panel and said distal end, said back side being concavely arcuate between said pivot and said distal end;
said arm has a plurality of valleys each extending into said back side to define a plurality of peaks spaced apart from each other and distributed along said back side, said plurality of peaks on said back side engaging said plurality of peaks on said outer surface of said gear;
said arm is urged upwardly when said motor rotates in said first direction for lifting said panel; and
said arm is urged downwardly when said motor rotates in said second direction for lowering said panel.

6. The assembly according to claim 4, wherein said control is electrically coupled to said motor associated with each of said lifting units, said control including a power button, a lift button for lifting said panel and a lower button for lowering said panel.

7. The assembly according to claim 6, wherein:
said power button has an outer edge being continuously arcuate such that said power button has a circular shape;
each of said lift button and said lower button has an outside edge which as a plurality of intersecting sides such that each of said lift button and said lower button has a triangular shape;
said lift button is oriented to point in a lifting direction on said control; and
said lower button is oriented to point in a lowering direction on said control; and
said assembly includes a power supply being mounted to said top wall of said base, said power supply being electrically coupled to said control, said power supply comprising at least one battery.

* * * * *